(12) United States Patent
Liu et al.

(10) Patent No.: US 11,074,230 B2
(45) Date of Patent: Jul. 27, 2021

(54) DATA MATCHING ACCURACY BASED ON CONTEXT FEATURES

(71) Applicant: INTERNATIONAL BUSINESS MACHINES CORPORATION, Armonk, NY (US)

(72) Inventors: Pei Ni Liu, Beijing (CN); Jian Min Jiang, Beijing (CN); Jing Min Xu, Beijing (CN); Yaoping Ruan, White Plains, NY (US); Hui Lei, Scarsdale, NY (US); Michael Smith, Watertown, WI (US); Bradley W. Crawford, Oakville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 16/120,949

(22) Filed: Sep. 4, 2018

(65) Prior Publication Data

US 2020/0073988 A1 Mar. 5, 2020

(51) Int. Cl.
*G06F 16/21* (2019.01)
(52) U.S. Cl.
CPC ................... *G06F 16/211* (2019.01)
(58) Field of Classification Search
CPC ............... G06F 16/254; G06F 16/211
See application file for complete search history.

(56) References Cited

U.S. PATENT DOCUMENTS

| 7,899,764 B2 | 3/2011 | Martin et al. |
| 2003/0120651 A1* | 6/2003 | Bernstein ................ G06F 16/86 |
| 2007/0011175 A1 | 1/2007 | Langseth et al. |

(Continued)

FOREIGN PATENT DOCUMENTS

WO WO2015149114 8/2015

OTHER PUBLICATIONS

Sun, Yao, "Methods for Automated Concept Mapping Between Medical Databases", Journal of Biomedical Informatics, 37 (2004), Apr. 2004, pp. 162-178.

(Continued)

*Primary Examiner* — Marc S Somers
(74) *Attorney, Agent, or Firm* — Tutunjian & Bitetto, P.C.; Joseph Petrokaitis

(57) ABSTRACT

A method is provided for data matching between a set of source data structures and a set of target data structures. The method includes obtaining, using a processor device configured to perform machine learning, source to target matching results with matching scores, based on the sets of source and target data structures. The method further includes calculating, by the processor device, context information for data structure pairs based on a structure similarity and an ontology similarity between constituent data structures thereof. Each of data structure pairs include as the constituent data structures a respective source data structure and a respective target data structure from the sets of source and target data structures. The method also includes updating, by the processor device, the matching scores based on the context information. The method additionally includes controlling, by the processor device, a hardware device responsive to at least one updated matching score.

18 Claims, 15 Drawing Sheets

(56) References Cited

U.S. PATENT DOCUMENTS

| | | |
|---|---|---|
| 2008/0027930 A1 | 1/2008 | Bohannon et al. |
| 2010/0185637 A1* | 7/2010 | Morris .............. G06F 16/24556 |
| | | 707/758 |
| 2011/0173149 A1 | 7/2011 | Schon |
| 2012/0233182 A1* | 9/2012 | Baudel .................. G06F 16/258 |
| | | 707/748 |
| 2013/0031117 A1* | 1/2013 | Mandelstein ........... G06F 16/84 |
| | | 707/758 |
| 2015/0134592 A1 | 5/2015 | Verger-Del Bove et al. |
| 2016/0063209 A1 | 3/2016 | Malaviya |
| 2018/0046568 A1* | 2/2018 | Amornkul ........... G06F 11/3409 |

OTHER PUBLICATIONS

Anam, Sarawat, "Incremental Knowledge-based System for Schema Mapping", UTAS, Faculty of Science Engineering & Technology, School of Engineering and ICT, A thesis submitted in fullment of the requirements for the degree of Doctor of Philosophy, Mar. 2016, 230 pages.

* cited by examiner

DATA MATCHING ACCURACY BASED ON CONTEXT FEATURES

BACKGROUND

Technical Field

The present invention generally relates to data processing, and more particularly to improving data matching accuracy based on context features.

Description of the Related Art

In various fields including, for example, but not limited to, the healthcare field, data integration is an important and required task. Currently, various Extract Transform and Load (ETL) tools exist to help automate data integration. However, the data mapping stages still mainly depends on manual work, which is often time consuming and tedious and can lack a desired level of matching accuracy. Accordingly, there is a need for improved data matching accuracy.

SUMMARY

According to an aspect of the present invention, a computer-implemented method is provided for data matching between a set of source data structures and a set of target data structures. The method includes obtaining, using a processor device configured to perform machine learning, source to target matching results with matching scores, based on the sets of source and target data structures. The method further includes calculating, by the processor device, context information for data structure pairs based on a structure similarity and an ontology similarity between constituent data structures thereof. Each of data structure pairs include as the constituent data structures a respective source data structure and a respective target data structure from the sets of source and target data structures. The method also includes updating, by the processor device, the matching scores based on the context information. The method additionally includes controlling, by the processor device, a hardware device responsive to at least one of the updated matching scores.

According to another aspect of the present invention, a computer program product is provided for data matching between a set of source data structures and a set of target data structures. The computer program product includes a non-transitory computer readable storage medium having program instructions embodied therewith. The program instructions are executable by a computer to cause the computer to perform a method. The method includes obtaining, using a processor device configured to perform machine learning, source to target matching results with matching scores, based on the sets of source and target data structures. The method further includes calculating, by the processor device, context information for data structure pairs based on a structure similarity and an ontology similarity between constituent data structures thereof. Each of data structure pairs include as the constituent data structures a respective source data structure and a respective target data structure from the sets of source and target data structures. The method also includes updating, by the processor device, the matching scores based on the context information. The method additionally includes controlling, by the processor device, a hardware device responsive to at least one of the updated matching scores.

According to yet another aspect of the present invention, a computer processing system is provided for data matching between a set of source data structures and a set of target data structures. The system includes a memory for storing program code. The system further includes a processor device operatively coupled to the memory and configured to perform machine learning by running the program code to obtain source to target matching results with matching scores, based on the sets of source and target data structures. The processor device runs the program code further to calculate context information for data structure pairs based on a structure similarity and an ontology similarity between constituent data structures thereof. Each of data structure pairs include as the constituent data structures a respective source data structure and a respective target data structure from the sets of source and target data structures. The processor device runs the program code also to update the matching scores based on the context information. The processor device runs the program code additionally to control a hardware device responsive to at least one of the updated matching scores.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
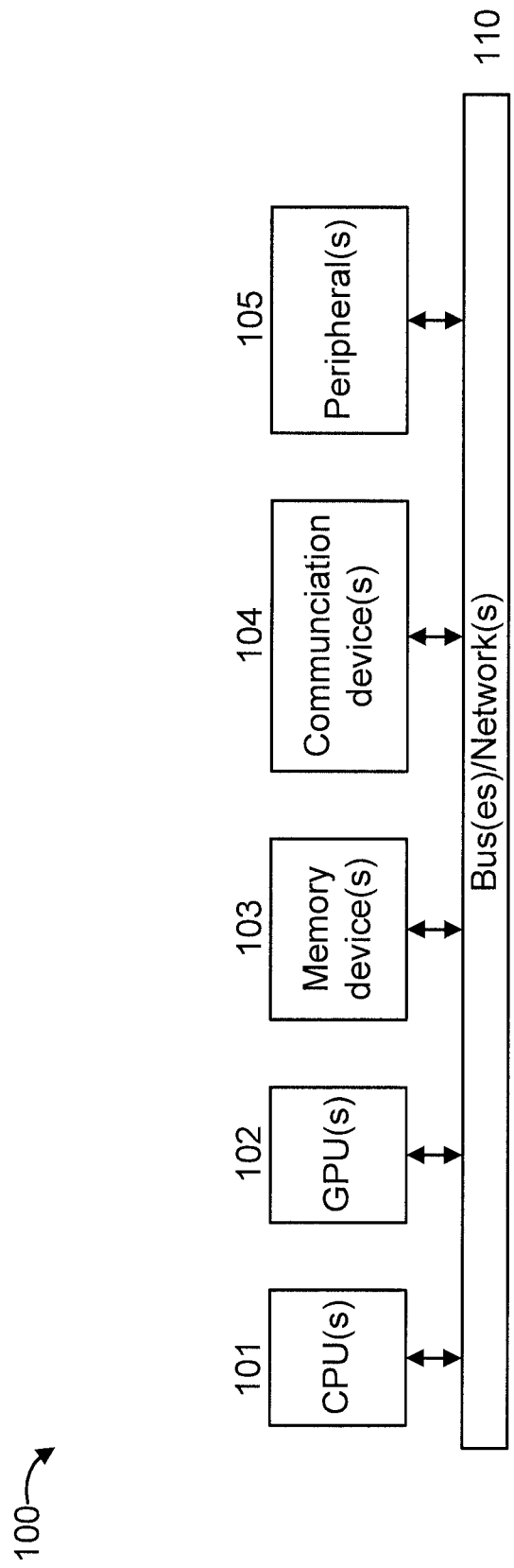
FIG. 1 is a block diagram showing an exemplary processing system to which the present invention may be applied, in accordance with an embodiment of the present invention.

The present invention is directed to improved data matching accuracy based on context features.

In an embodiment, the present invention provides a cognitive solution to aid in automating a data mapping process. For example, in an embodiment, the present invention uses context information to improve data mapping accuracy. In an embodiment, the involved mappings can be from a source field to a target field.

In an embodiment, the present invention is particularly suited to data structures having two dimensions such as, for example, columns and rows. For example, in an embodiment, the present invention is particularly suited to, for example, but not limited to, tables, matrices and/or so forth. Hence, for example, for a Relational Database (RDB), the present invention can calculate the context information based on columns and their corresponding tables in the RDB. However, the present invention can be readily applied to other types of data structures and/or formats, while maintaining the spirit of the present invention. For example, in the case of eXtensible Markup Language (XML), the context information can be calculated based on layered elements and attributes. Examples of such layered elements can include, but are not limited to, root elements, sub-elements, attributes and values thereof, and so forth. Moreover, examples of the attributes of the layered elements can include, but are not limited to, string values, numeric values, and so forth. Thus, while one or more embodiments are described with respect to a RDB for the sake of illustration, the present invention can be readily applied to other types of data structures and/or formats.

In an embodiment, the present invention exploits structure similarity in the data structures involved in a data matching process. For example, two columns are similar if their neighbors are similar (e.g., the score will increase based on the similarity of the neighborhood). The similarity score between two tables will increase if some of the columns of the two tables are similar. Also, the similarity score between the columns will increase if their tables are similar.

In an embodiment, the present invention exploits ontology similarity in the data structures involved in a data matching process. For example, a particular column is likely a match to a related ontology target if its neighbor column matches the ontology target. Hence, in the case of the following example, if the neighborhood of column A matches a drug name (that is, an ontology target), then the chance of column A matching a dose (that is, a related ontology target) increases.

Hence, in an embodiment, the present invention leverages the features of a neighborhood in order to assist in improving the accuracy of data matching. For example, in an embodiment, structure similarity is used to discover table mapping pairs (to be compared to each other) and enhance sub-column mapping results. Moreover, in an embodiment, ontology similarity is used to discover the ontology neighbors and enhance neighborhood mapping results. Accordingly, the present invention can reduce and/or otherwise avoid a human workload by automatically discovering and computing these context features.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 14-15). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

It is to be appreciated that system 100 can be part of another system such as an Internet-based query system, a database query system, a (pattern, sound, speech, text, etc.) recognition system, and so forth. These and other applications of system 100 and of the invention itself are ready determined by one of ordinary skill in the art given the teachings of the present invention provided herein, while maintaining the spirit of the present invention.

A four-step method for computing structure similarity for improved data matching will now be described with respect to a flowchart shown in FIG. 2, with each step of the flowchart or an element related to each step of the flowchart, except the last step, graphically shown in FIGS. 3-5, respectively.

Figure 2:
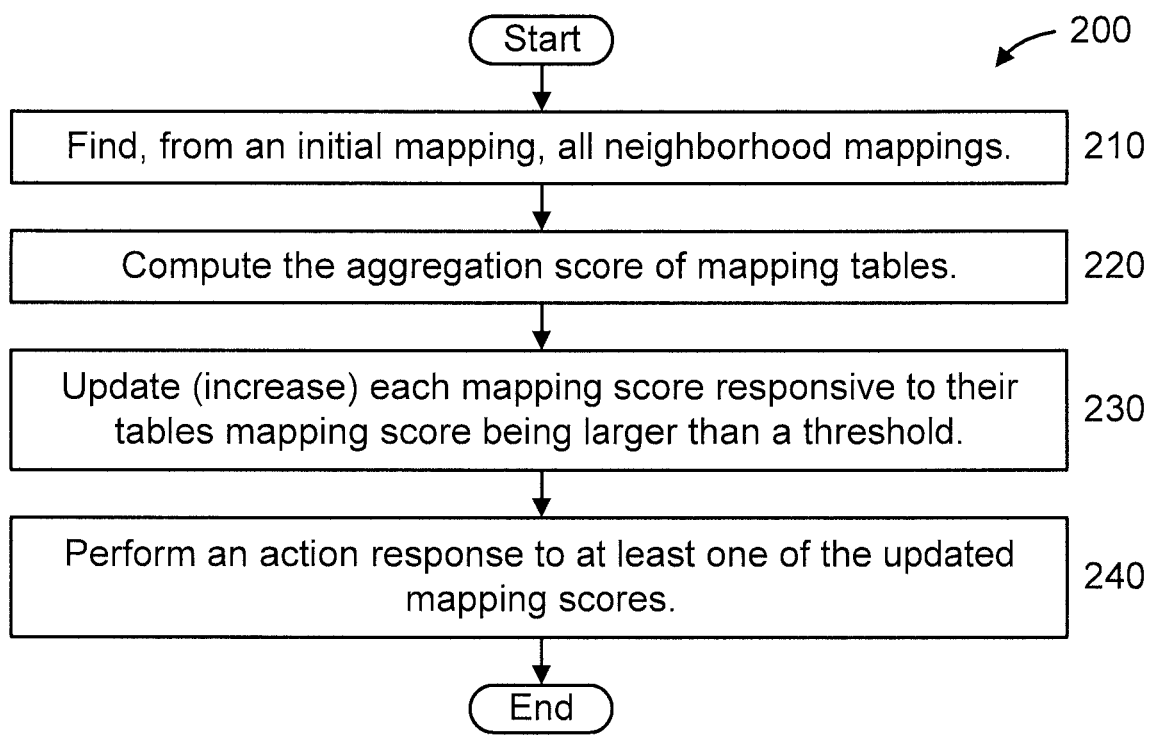
FIG. 2 is a flow diagram showing an exemplary method for computing structure similarity to improve data matching accuracy based on context features, in accordance with an embodiment of the present invention.

FIG. 2 is a flow diagram showing an exemplary method 200 for computing structure similarity to improve data matching accuracy based on context features, in accordance with an embodiment of the present invention.

At block 210, find, from an initial mapping, all neighborhood mappings.

Figure 3:
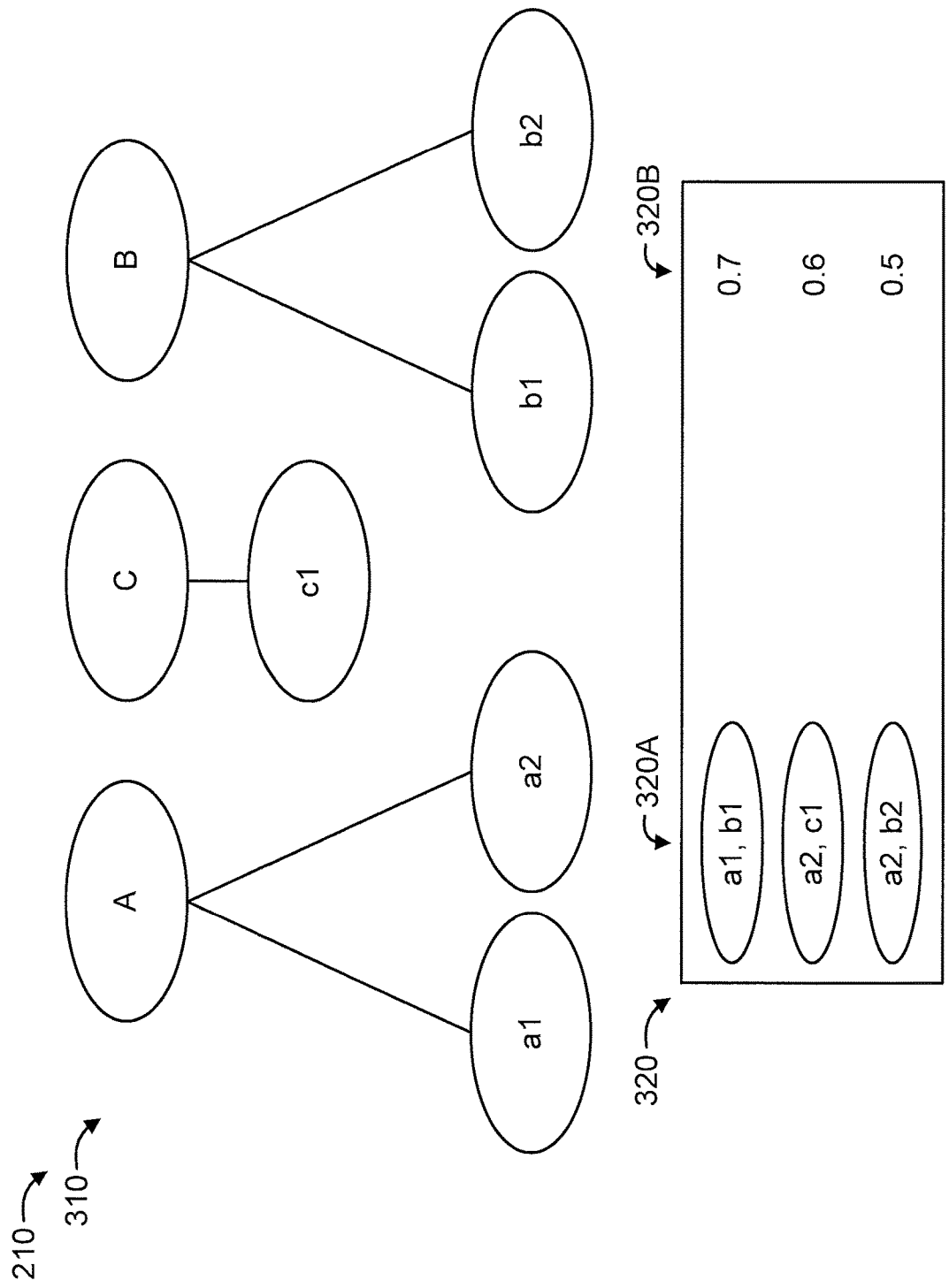
FIG. 3 is a block diagram graphically showing a block of the method of FIG. 2, in accordance with an embodiment of the present invention.

FIG. 3 is a block diagram graphically showing block 210 of method 200, in accordance with an embodiment of the present invention. In FIG. 3, the capital letters A through C represent tables (tables A through C), and characters a1 and a2 represent columns of table A, characters b1 and b2 represent columns of table B, and characters c1 represent a column of table C. In further detail, FIG. 3 shows the initial (original) mapping 310 from which the neighborhood mappings are found, as well as a result of block 320 indicating the neighborhood mappings 320A and neighborhood mapping scores 320B. In the example of FIG. 3, a1 and b1 are neighbors with a score of 0.7, a2 and c1 are neighbors with a score of 0.6, and a2 and b2 are neighbors with a score of 0.5

At block 220, compute the aggregation score of mapping tables. For example, block 220 can involve computing the average scores of the columns under each table pair to be compared.

Figure 4:
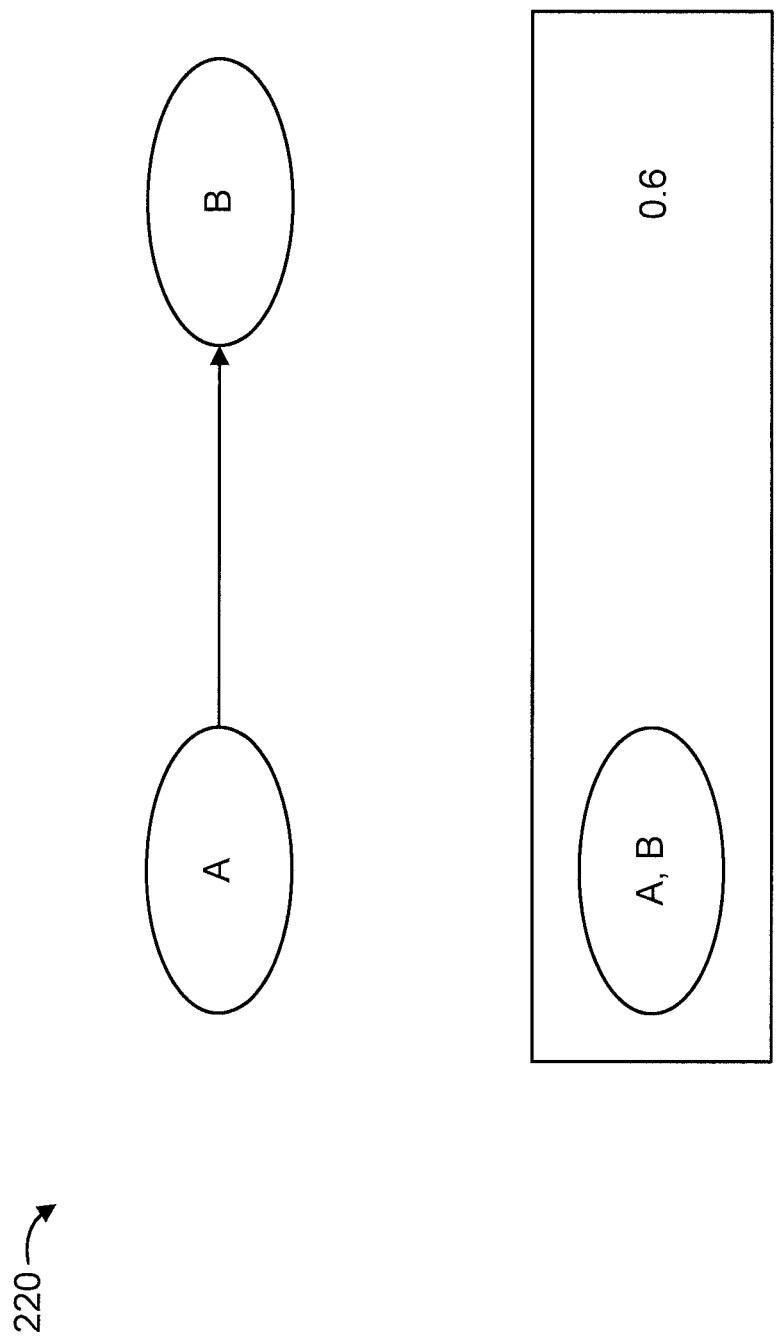
FIG. 4 is a block diagram graphically showing another block of the method of FIG. 2, in accordance with an embodiment of the present invention.

FIG. 4 is a block diagram graphically showing block 220 of method 200, in accordance with an embodiment of the present invention. In particular, FIG. 4 graphically shows the computation of a table level mapping. In the example of FIG. 4, the average scores of the columns under table pair A and B are [(0.7+0.5)/2]=0.6.

At block 230, update (increase) each mapping score responsive to their tables mapping score being larger than the threshold. As an example, a threshold of 0.4 can be used.

Figure 5:
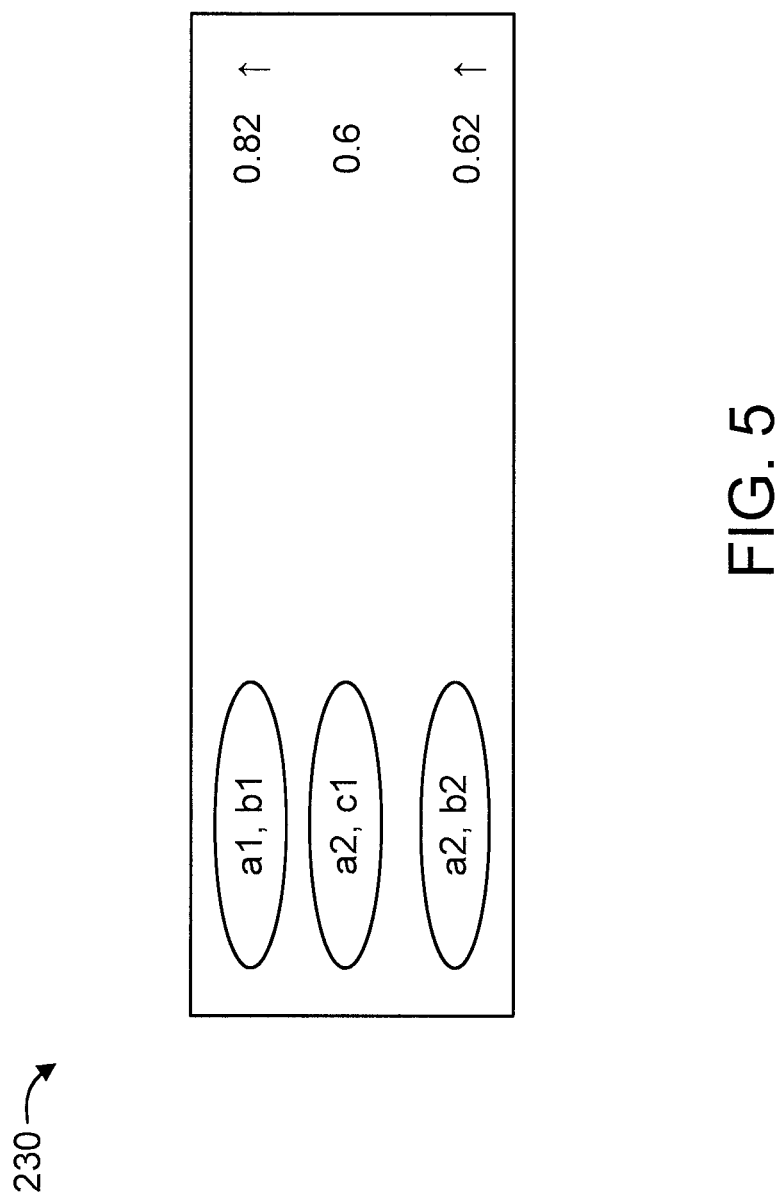
FIG. 5 is a block diagram graphically showing yet another block of the method of FIG. 2, in accordance with an embodiment of the present invention.

FIG. 5 is a block diagram graphically showing block 230 of method 200, in accordance with an embodiment of the present invention. In particular, FIG. 5 shows an enhanced mapping resulting from block 230. In particular, the score of the neighborhood mapping of a1 and b1 is increased (from 0.7) to 0.82. the score the neighborhood mapping of a2 and c1 is kept the same, and the score of the neighborhood mapping of a2 and b2 is increased (from 0.5) to 0.62, based on a threshold of 0.6.

At block 240, perform an action responsive to at least one of the updated mapping scores. Thus, in the case of a match determined with more confidence due to a value being updated, a corresponding action can be performed. The action can involve controlling a hardware device (e.g., a computer, a monitor (to display updated scores, etc.), a lock, a vehicle, etc.). The action can involve displaying the updated mapping score(s). The action can involve allowing access to a hardware device, a service, a program, a facility, and so forth, in the case where, for example, the match pertains to a user identity. In other applications, the match can be to a dangerous impending condition (a car crash) such that the brakes will be automatically applied as the action, or a corrective steering action. The applications to which the present invention can be applied are readily determined by one of ordinary skill in the art, given the teachings of the present invention provided herein, while maintaining the spirit of the present invention.

Figure 6:
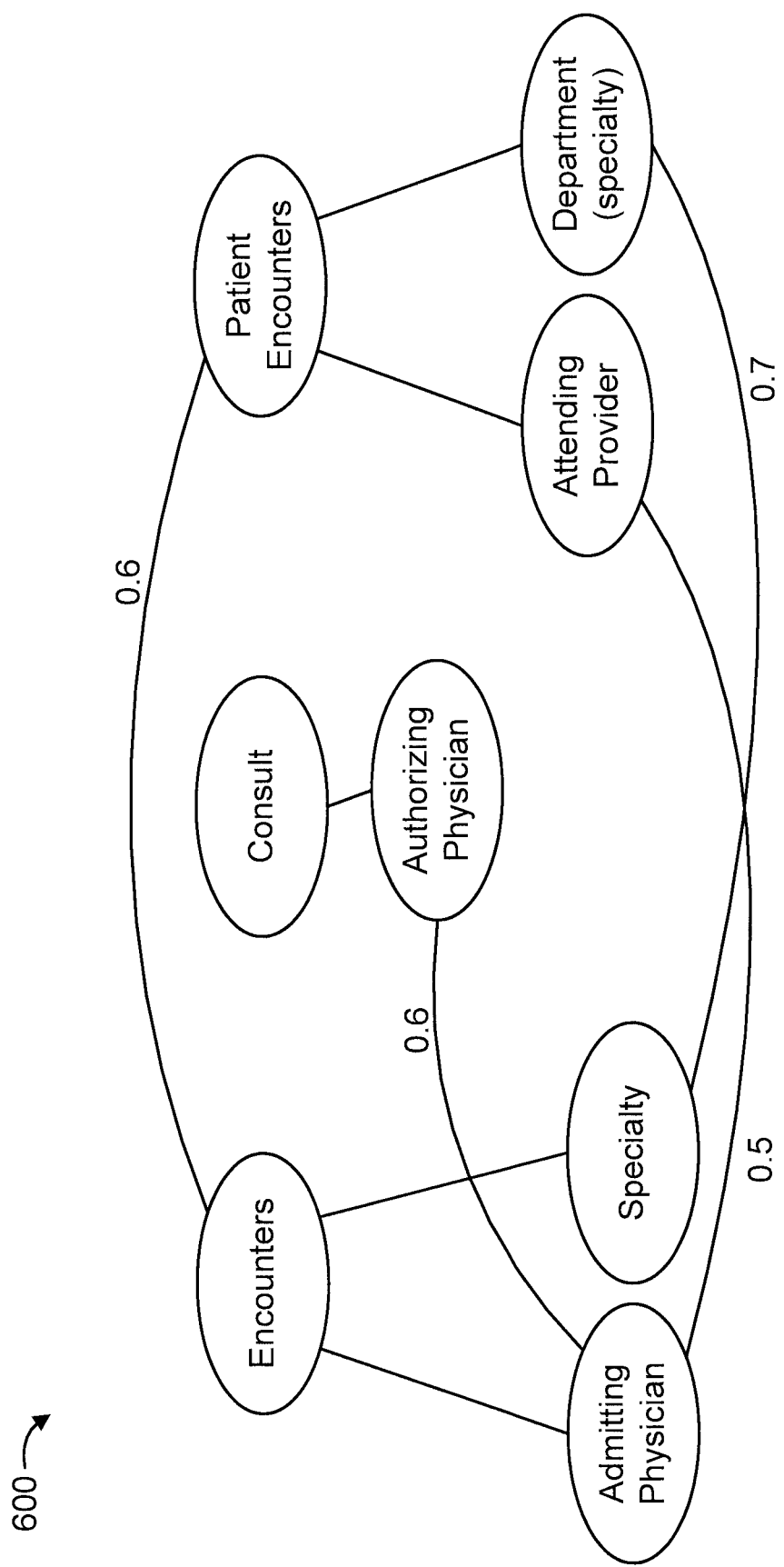
FIG. 6 is a block diagram showing an exemplary data mapping, prior to application of the method of FIG. 2 thereto, in accordance with an embodiment of the present invention.

FIG. 6 is a block diagram showing an exemplary data mapping 600, prior to application of method 200 of FIG. 2 thereto, in accordance with an embodiment of the present invention.

Figure 7:
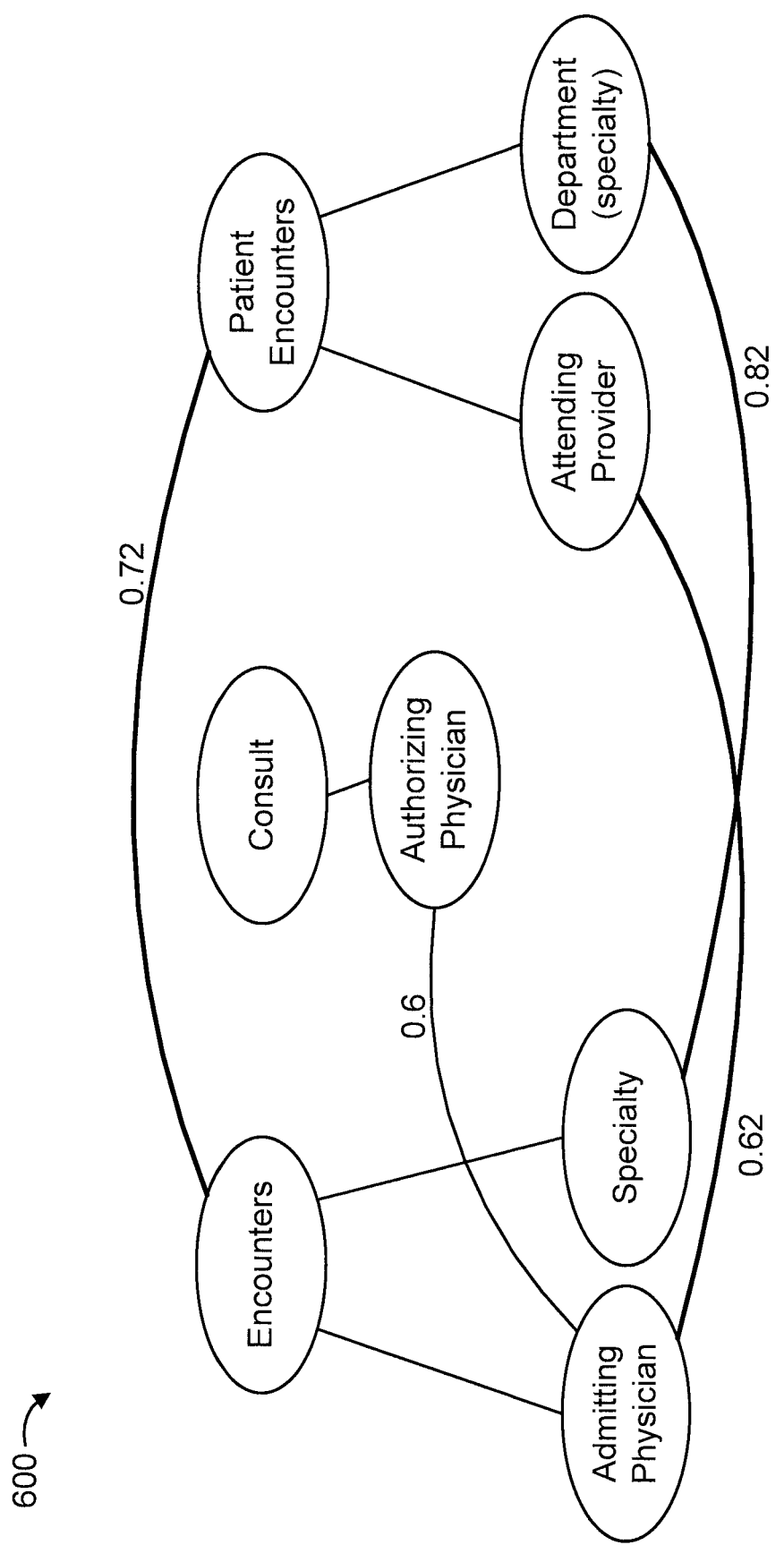
FIG. 7 is a block diagram showing the exemplary data mapping of FIG. 6, subsequent to an application of the method of FIG. 2 thereto, in accordance with an embodiment of the present invention.

FIG. 7 is a block diagram showing the exemplary data mapping 600 of FIG. 6, subsequent to an application of method 200 of FIG. 2 thereto, in accordance with an embodiment of the present invention.

The data mapping 600 includes the following primary nodes (e.g., table headings): encounters; consult; patient encounters. The data mapping 600 includes the following non-primary nodes (columns) for the primary node (table) labeled "encounters": admitting physician; and specialty. The data mapping 600 includes the following non-primary nodes (columns) for the primary node (table) labeled "consult": authorizing physician. The data mapping 600 includes the following non-primary nodes (columns) for the primary node (table) labeled "patent encounters": attending provider; and department (specialty). Solid lines from one node to another node are edges, some of which are labeled with matching scores representing a matching probability of one node to another node.

The edges that are labeled with matching scores for the data mapping 600 prior to application of the method 200 include the following:
(i) From encounters to patient encounters=0.6;
(ii) From admitting physician to authorizing physician=0.6; and
(iii) From admitting physician to attending provider=0.6.
(iv) From specialty to department (specialty)=0.7.

The updated matching scores for the data mapping 600 subsequent to application of the method 200 includes the following:
(i') From encounters to patient encounters=0.72;
(ii') From admitting physician to authorizing physician=0.6; and
(iii') From admitting physician to attending provider=0.6.
(iv') From specialty to department (specialty)=0.82.

As can be seen (using bolded (i.e., thicker lines)), the matching scores for items (i), (ii), and (iv) have increased due to application of the method 200 of FIG. 2.

A four-step method for computing ontology similarity for improved data matching will now be described with respect to a flowchart shown in FIG. 8, with each step of the flowchart or an element related to each step of the flowchart, except the last step, graphically shown in FIGS. 9-11, respectively.

Figure 8:
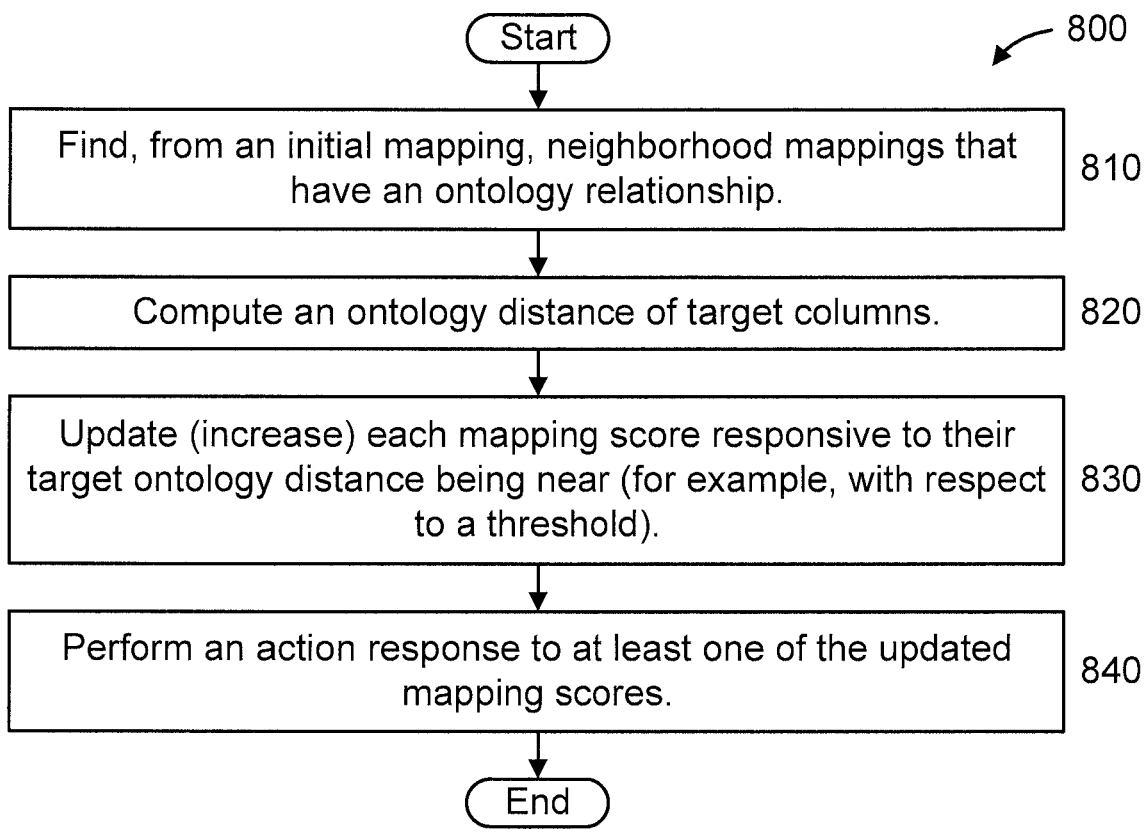
FIG. 8 is a flow diagram showing an exemplary method for computing ontology similarity to improve data matching accuracy based on context features, in accordance with an embodiment of the present invention.

FIG. 8 is a flow diagram showing an exemplary method 800 for computing ontology similarity to improve data matching accuracy based on context features, in accordance with an embodiment of the present invention.

At block 810, find, from an initial mapping, neighborhood mappings that have an ontology relationship.

Figure 9:
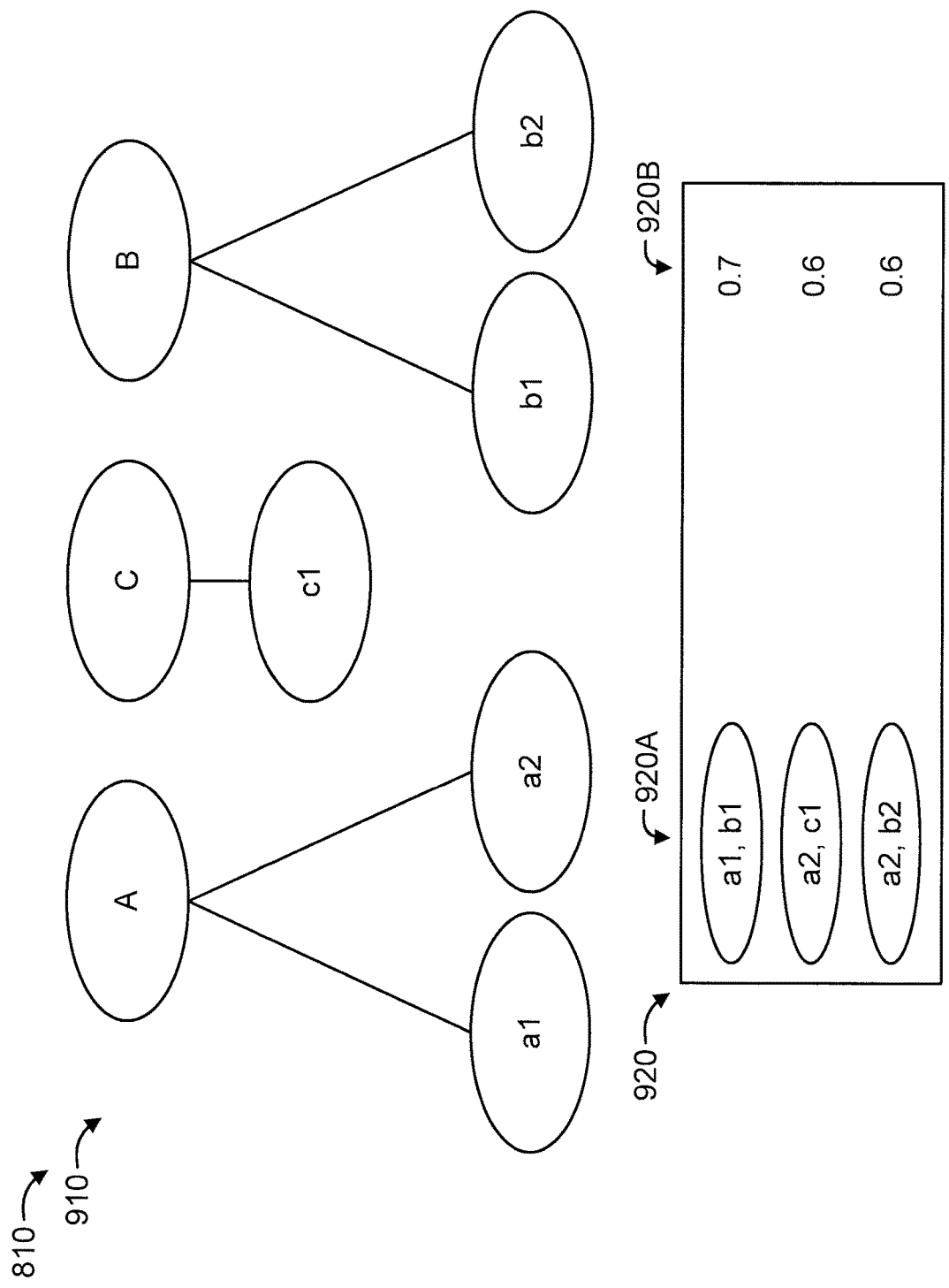
FIG. 9 is a block diagram graphically showing a block of the method of FIG. 8, in accordance with an embodiment of the present invention.

FIG. 9 is a block diagram graphically showing block 810 of method 800, in accordance with an embodiment of the present invention. In FIG. 9, the capital letters A through C represent tables (tables A through C), and characters a1 and a2 represent columns of table A, characters b1 and b2 represent columns of table B, and characters c1 represent a column of table C. In further detail, FIG. 3 shows the initial (original) mapping 910 from which the neighborhood mappings are found, as well as a result of block 920 indicating the neighborhood mappings 920A and neighborhood mapping scores 920B. In the example of FIG. 9, a1 and b1 are neighbors with a score of 0.7, a2 and c1 are neighbors with a score of 0.6, and a2 and b2 are neighbors with a score of 0.6

At block 820, compute an ontology distance of target columns.

Figure 10:
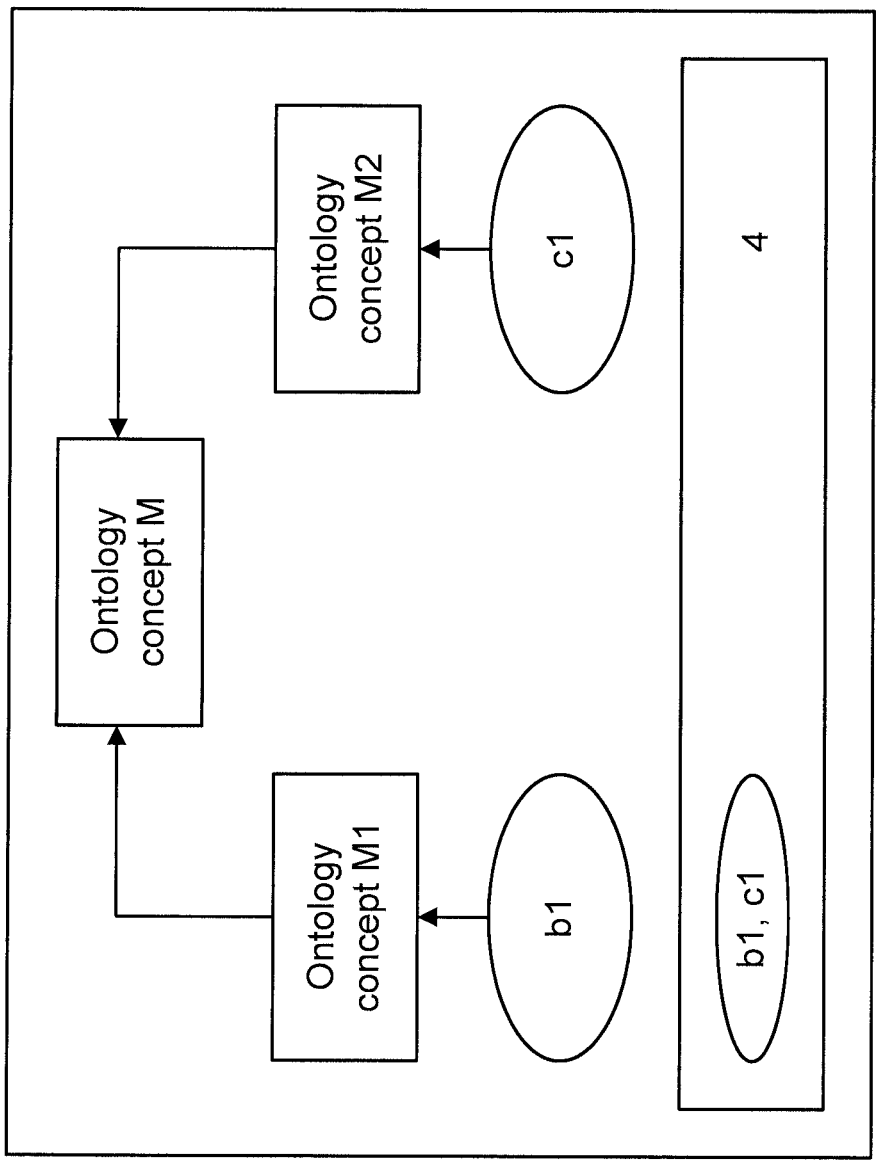
FIG. 10 is a block diagram graphically showing another block of the method of FIG. 8, in accordance with an embodiment of the present invention.

FIG. 10 is a block diagram graphically showing block 820 of method 800, in accordance with an embodiment of the present invention. In particular, FIG. 10 graphically shows the computation 1000 of ontology distance. Hence, for a given ontology concept M, there can be (related) ontology concepts M1 and M2 relating to column b1 of table B and column c1 of table C. Accordingly, the ontology distance from b1 to c1 is 4, which is obtained as the shortest path to the other node as follows: b1→concept M1→concept M→concept M2→c1, involving 4 hops (with each hop denoted by an arrow in the preceding sentence portion. It is to be appreciated that the preceding represents one way in which distance can be computed. However, the present invention is not limited to the same and, thus, other approaches to computing distance can also be used, while maintaining the spirit of the present invention.

At block 830, update (increase) each mapping score responsive to their target ontology distance being near (for example, with respect to a threshold).

Figure 11:
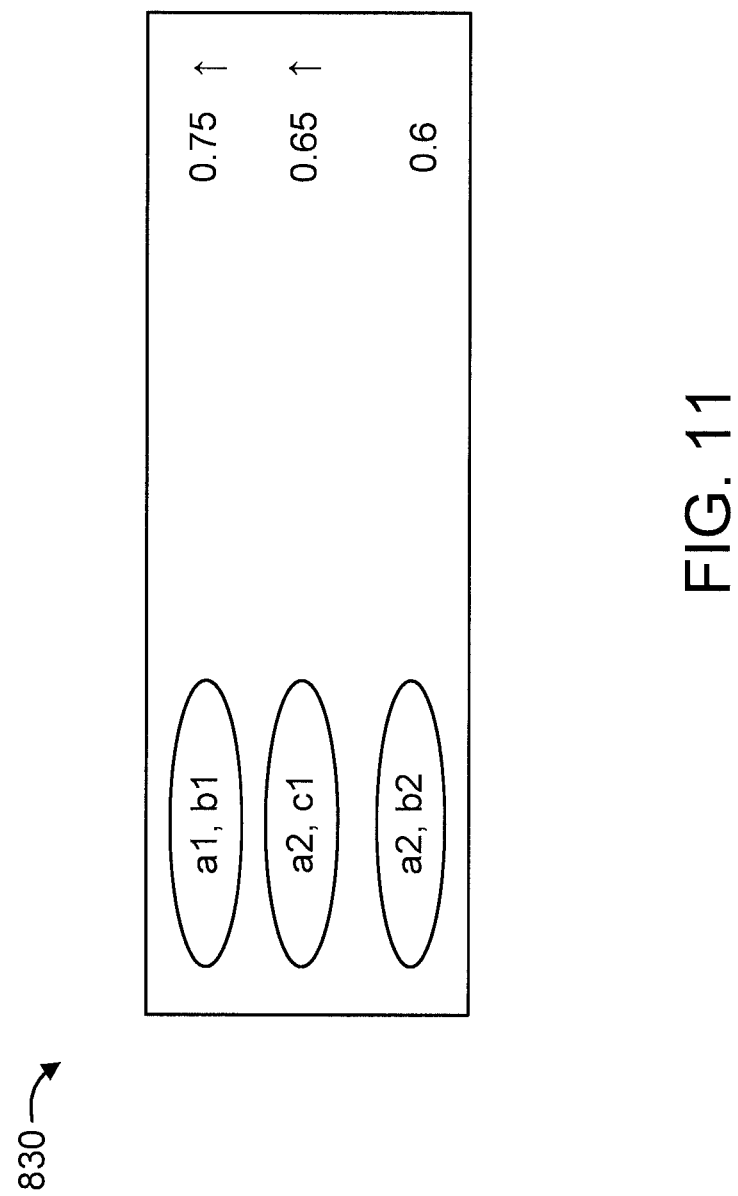
FIG. 11 is a block diagram graphically showing yet another block of the method of FIG. 8, in accordance with an embodiment of the present invention.

FIG. 11 is a block diagram graphically showing block 830 of method 800, in accordance with an embodiment of the present invention. In particular, FIG. 11 shows an enhanced mapping resulting from block 830. In particular, the score of the neighborhood mapping of a1 and b1 is increased (from 0.7) to 0.75. the score the neighborhood mapping of a2 and c1 is increased (from 0.6) to 0.65, and the score of the neighborhood mapping of a2 and b2 is kept the same, based on a threshold. This threshold is set to compare with the distance, e.g., if the distance <=6 (threshold), then compute the enhanced mapping score.

At block 840, perform an action responsive to at least one of the updated mapping scores.

Figure 12:
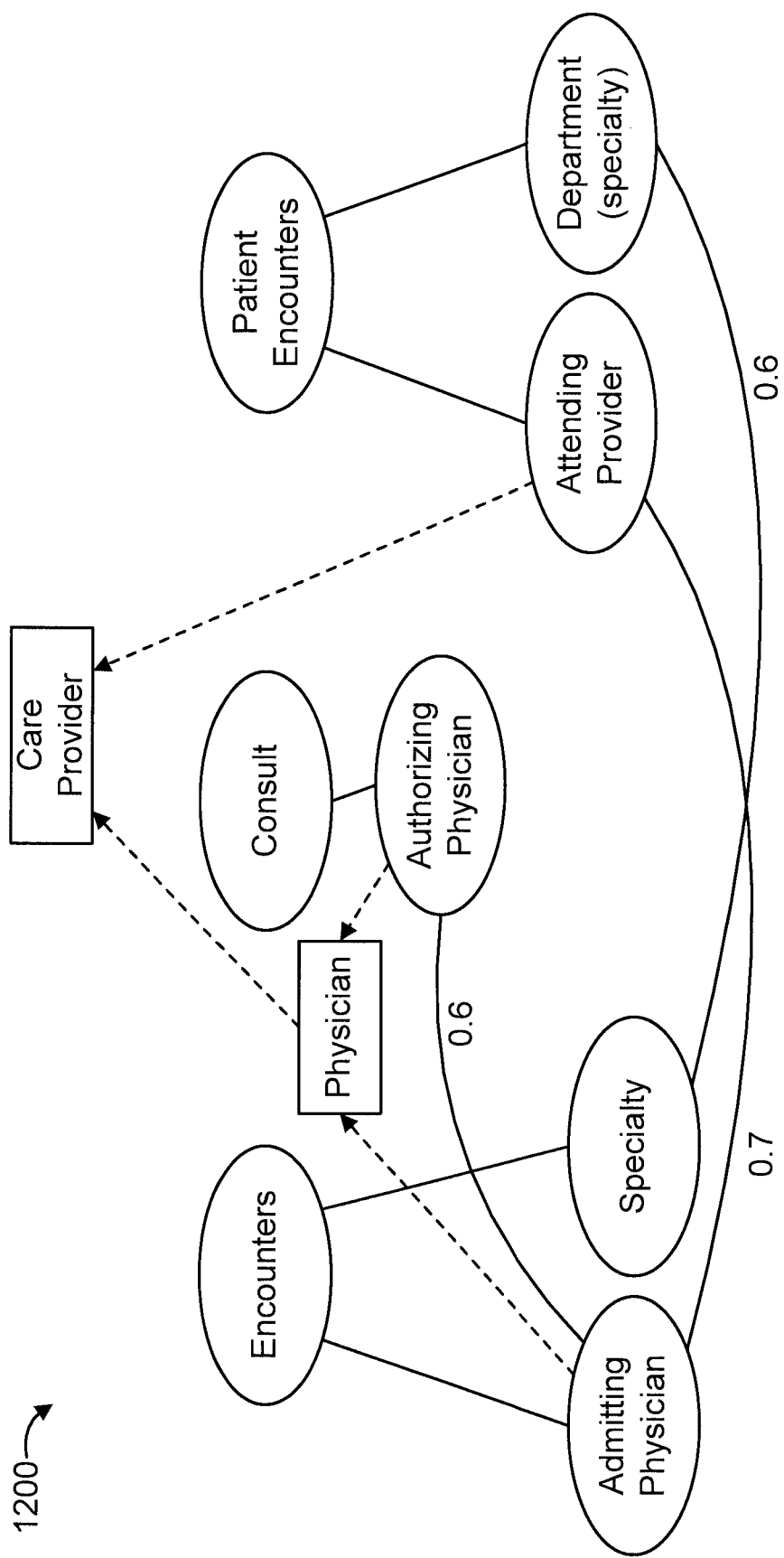
FIG. 12 is a block diagram showing an exemplary data mapping, prior to application of the method of FIG. 8 thereto, in accordance with an embodiment of the present invention.

FIG. 12 is a block diagram showing an exemplary data mapping 1200, prior to application of method 800 of FIG. 8 thereto, in accordance with an embodiment of the present invention.

Figure 13:
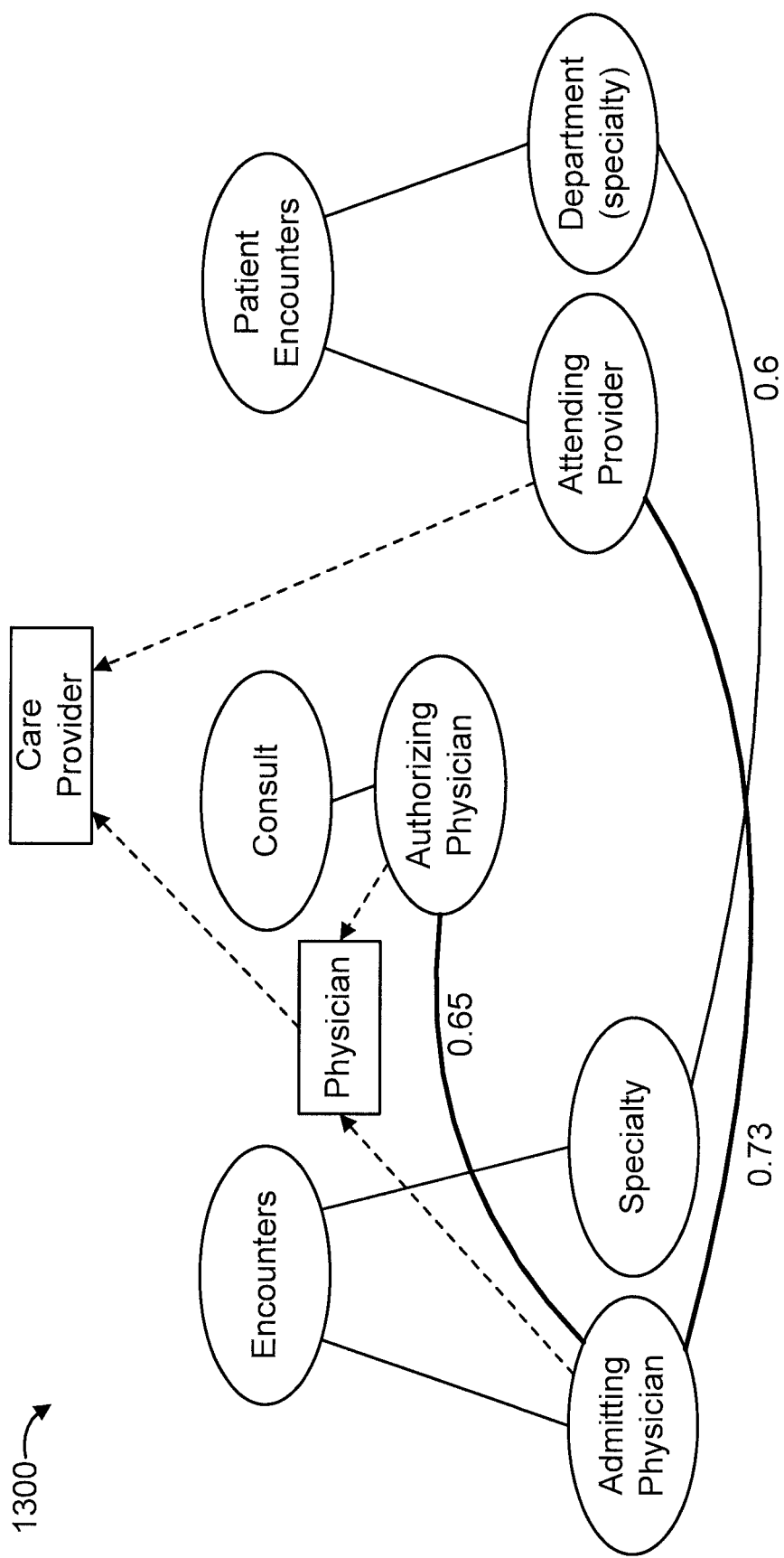
FIG. 13 is a block diagram showing the exemplary data mapping of FIG. 12, subsequent to an application of the method of FIG. 8 thereto, in accordance with an embodiment of the present invention.

FIG. 13 is a block diagram showing the exemplary data mapping 1200 of FIG. 12, subsequent to an application of method 800 of FIG. 8 thereto, in accordance with an embodiment of the present invention.

The data mapping 1200 includes the following primary nodes (e.g., table headings): encounters; consult; patient encounters. The data mapping 1200 includes the following non-primary nodes (columns) for the primary node (table) labeled "encounters": admitting physician; and specialty. The data mapping 1200 includes the following non-primary nodes (columns) for the primary node (table) labeled "consult": authorizing physician. The data mapping 1200 includes the following non-primary nodes (columns) for the primary node (table) labeled "patent encounters": attending provider; and department (specialty). The data mapping 1200 further includes the following ontological targets: care provider; and physician. Solid lines from one node to another node are edges, some of which are labeled with matching scores representing a matching probability of one node to another node.

The edges that are labeled with matching scores for the data mapping 1200 prior to application of the method 800 include the following:
(i) From admitting physician to authorizing physician=0.6; and
(ii) From admitting physician to attending provider=0.7.
(iii) From specialty to department (specialty)=0.6.

The updated matching scores for the data mapping 1200 subsequent to application of the method 800 includes the following:
(i') From admitting physician to authorizing physician=0.65; and
(ii') From admitting physician to attending provider=0.73.
(iii') From specialty to department (specialty)=0.6.

As can be seen (using bolded (i.e., thicker lines)), the matching scores for items (i) and (ii) have increased due to application of the method 800 of FIG. 8.

Hence, in an embodiment, method 200 and/or method 800 can be performed in order to improve data matching accuracy in a myriad of applications, as readily appreciated by one of ordinary skill in the art, given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
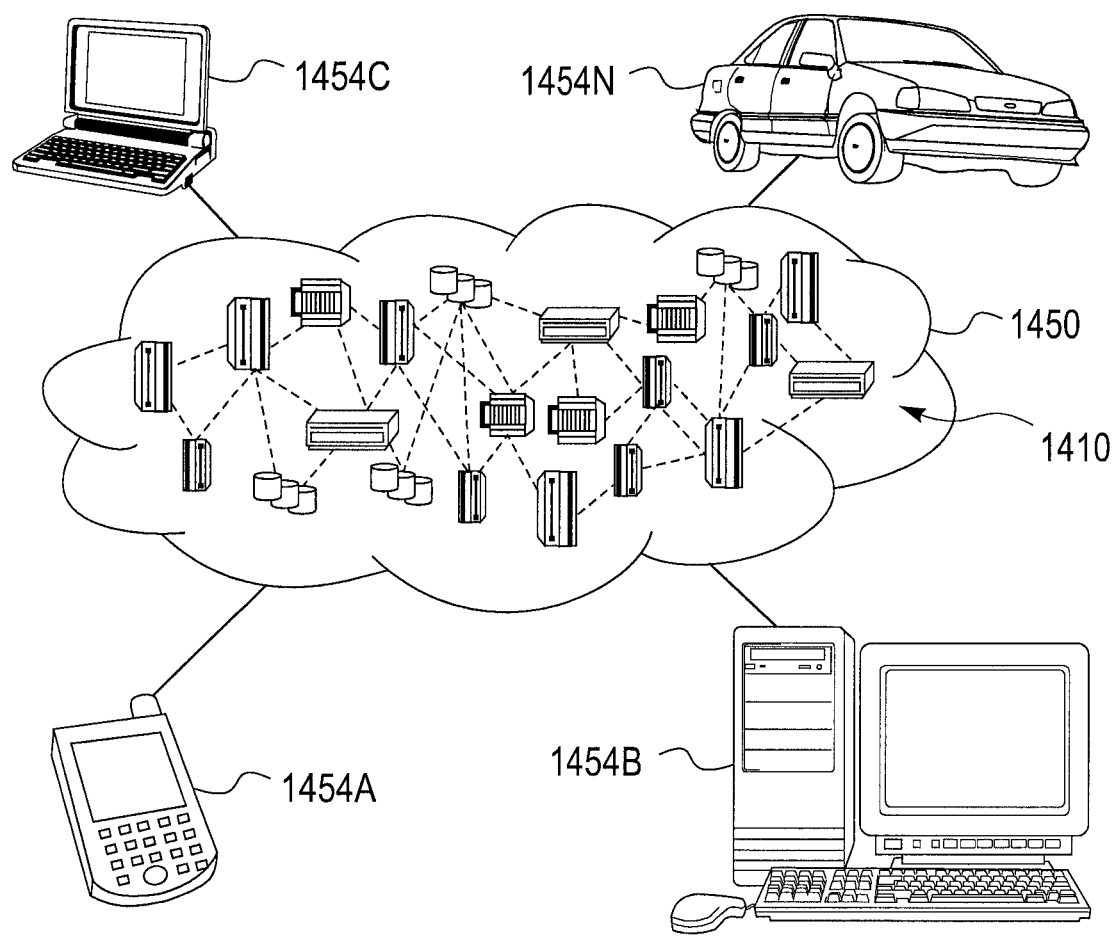
FIG. 14 is a block diagram showing an illustrative cloud computing environment having one or more cloud computing nodes with which local computing devices used by cloud consumers communicate in accordance with one embodiment.

Referring now to FIG. 14, illustrative cloud computing environment 1450 is depicted. As shown, cloud computing environment 1450 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
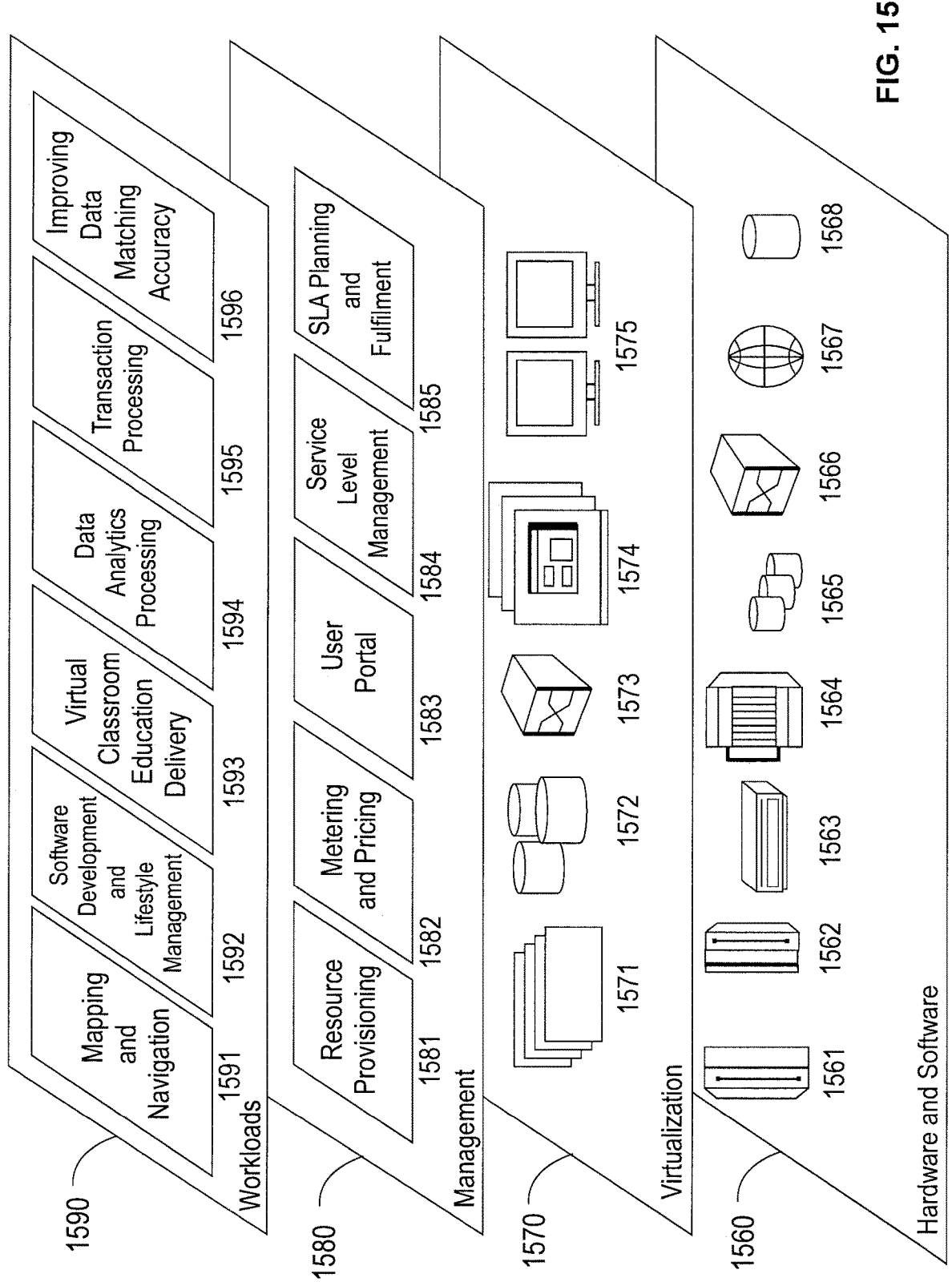
FIG. 15 is a block diagram showing a set of functional abstraction layers provided by a cloud computing environment in accordance with one embodiment.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and improved data matching accuracy based on context features 1596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for data matching between a set of source data structures and a set of target data structures, the method comprising:
   obtaining, using a processor device configured to perform machine learning, source to target matching results with matching scores, based on the sets of source and target data structures;
   calculating, by the processor device, context information for data structure pairs based on a structure similarity and an ontology similarity between constituent data structures thereof, each of data structure pairs comprising as the constituent data structures a respective source data structure and a respective target data structure from the sets of source and target data structures;
   updating, by the processor device, the matching scores based on the context information;
   controlling, by the processor device, a hardware device responsive to at least one of the updated matching scores; and
   wherein the method further comprises determining the structure similarity by finding all neighborhood mappings from an initial mapping and computing an aggregation score for each of the data structure pairs, and wherein the matching scores for the data structure pairs having the aggregation score greater than a threshold are increased by said updating step.

2. The computer-implemented method of claim 1, wherein for a relational database, the context information based on the structure similarity is, in turn, based on a respective source table and a respective target table and columns in the respective source and target tables.

3. The computer-implemented method of claim 2, wherein the structure similarity score for a given data structure pair increases responsive to most of the columns matching between the respective source and target tables that comprise the given data structure pair, and wherein the structure similarity score for a column pair formed from a respective column in each of the respective source and target tables increases responsive to the structure similarity score for the respective source and target tables that include the column pair being greater than a threshold.

4. The computer-implemented method of claim 2, wherein the context information based on the source structure is calculated, in turn, based on a first premise that the respective source and target tables are considered to match responsive to most of the columns therebetween matching, and a second premise that at least one column in each of the respective source and target tables are considered to match responsive to the respective source and target tables being considered a match.

5. The computer-implemented method of claim 1, wherein for extensible markup language, the context information based on the structure similarity is, in turn, based on layered elements and attributes of the layered elements.

6. The computer-implemented method of claim 1, wherein the context information based on the ontology structure is calculated, in turn, based on a premise that a particular element of a data structure is likely to match an ontology target responsive to a neighboring element of the particular element matching a related ontology target with respect to the ontology target.

7. The computer-implemented method of claim 1, further comprising determining the ontology similarity by finding all neighborhood mappings having an ontology relationship from an initial mapping and computing an ontology distance between members of the data structure pairs, wherein the matching scores for the data structure pairs having the ontology distance greater than a threshold are increased by said updating step.

8. The computer-implemented method of claim 1, wherein the method is performed by a server comprised in a cloud computing platform, and the processor device is comprised in the server.

9. A computer program product for data matching between a set of source data structures and a set of target data structures, the computer program product comprising a non-transitory computer readable storage medium having program instructions embodied therewith, the program instructions executable by a computer to cause the computer to perform a method comprising:
   obtaining, using a processor device configured to perform machine learning, source to target matching results with matching scores, based on the sets of source and target data structures;
   calculating, by the processor device, context information for data structure pairs based on a structure similarity and an ontology similarity between constituent data structures thereof, each of data structure pairs comprising as the constituent data structures a respective source data structure and a respective target data structure from the sets of source and target data structures;
   updating, by the processor device, the matching scores based on the context information;
   controlling, by the processor device, a hardware device responsive to at least one of the updated matching scores; and
   wherein the method further comprises determining the structure similarity by finding all neighborhood mappings from an initial mapping and computing an aggregation score for each of the data structure pairs, and wherein the matching scores for the data structure pairs having the aggregation score greater than a threshold are increased by said updating step.

10. The computer program product of claim 9, wherein for a relational database, the context information based on the structure similarity is, in turn, based on a respective source table and a respective target table and columns in the respective source and target tables.

11. The computer program product of claim 10, wherein the structure similarity score for a given data structure pair increases responsive to most of the columns matching between the respective source and target tables that comprise the given data structure pair, and wherein the structure similarity score for a column pair formed from a respective column in each of the respective source and target tables increases responsive to the structure similarity score for the respective source and target tables that include the column pair being greater than a threshold.

12. The computer program product of claim 10, wherein the context information based on the source structure is calculated, in turn, based on a first premise that the respective source and target tables are considered to match responsive to most of the columns therebetween matching, and a second premise that at least one column in each of the respective source and target tables are considered to match responsive to the respective source and target tables being considered a match.

13. The computer program product of claim 9, wherein for extensible markup language, the context information based on the structure similarity is, in turn, based on layered elements and attributes of the layered elements.

14. The computer program product of claim 9, wherein the context information based on the ontology structure is calculated, in turn, based on a premise that a particular element of a data structure is likely to match an ontology target responsive to a neighboring element of the particular element matching a related ontology target with respect to the ontology target.

15. The computer program product of claim 9, wherein the method further comprises determining the ontology similarity by finding all neighborhood mappings having an ontology relationship from an initial mapping and computing an ontology distance between members of the data structure pairs, wherein the matching scores for the data structure pairs having the ontology distance greater than a threshold are increased by said updating step.

16. The computer program product of claim 9, wherein the computer program product is comprised in the computer, and the computer is comprised in a cloud computing platform.

17. A computer processing system for data matching between a set of source data structures and a set of target data structures, the system comprising:

a memory for storing program code; and
a processor device operatively coupled to the memory and configured to perform machine learning by running the program code to
obtain source to target matching results with matching scores, based on the sets of source and target data structures;
calculate context information for data structure pairs based on a structure similarity and an ontology similarity between constituent data structures thereof, each of data structure pairs comprising as the constituent data structures a respective source data structure and a respective target data structure from the sets of source and target data structures;
update the matching scores based on the context information; and
control a hardware device responsive to at least one of the updated matching scores; and
wherein the processor device further determines the structure similarity by finding all neighborhood mappings from an initial mapping and computing an aggregation score for each of the data structure pairs, and wherein the matching scores for the data structure pairs having the aggregation score greater than a threshold are increased by the updating of the matching scores.

18. The computer processing system of claim 17, wherein the computer processing system is comprised in a cloud computing platform.

* * * * *